United States Patent Office 2,749,320
Patented June 5, 1956

2,749,320
SHORT OIL STYRENATED ALKYD AND METHOD

Norman Spellberg, Chicago, Ill., assignor to The Sherwin-Williams Company, Cleveland, Ohio, a corporation of Ohio No Drawing. Application January 8, 1952,
Serial No. 265,525

11 Claims. (Cl. 260—22)

This invention relates to a method of manufacture of clear homogeneous polymers of the semi-drying and drying oil-modified alkyd class condensed during manufacture with monovinyl aromatic compounds.

More particularly, this invention relates to novel resinous products characterized by their homogeneous nature useful in protective and decorative coatings containing a relativley high percentage of aromatic dicarboxylic acid in relation to the drying oil modifying component thereof, in which the drying oil fatty acid radical component is copolymerized with an aromatic monovinyl compound during the formation of the oil-modified alkyd.

It is to be observed at the outset that the method of making the herein described polymeric product is not applicable to all oil-modified alkyds, but applies in particular to a specific class of drying oil-modified alkyds as will appear below.

The alkyds of interest are first classified as being "short" oil-modified, and in the nomenclature used and developed within our laboratories, we define the length of oil-modified alkyd resins by a number which may be from about 5 to about 20. The higher the numerical value, the greater the percentage of oil or the longer the modification. This empirical designation of oil length is determined by dividing the weight of the aromatic dicarboxylic acid component in the resin-forming reactants by 7, and further dividing the total oil-modifying component of the resin by the first quotient obtained. The second quotient is the oil length as applied to alkyd varnishes for protective and decorative coatings.

In accordance with the above classification method, this invention is limited to oil-modified alkyd resins having in its broadest application an oil length between 5 and 10, and is of greater practical importance and merit in oil lengths from 6 to 9.

The oil length may also be expressed as the percentage of oil which would be incorporated in the oil-modified alkyd resin formed, exclusive of the aromatic monovinyl component. The percentage oil length is determined by dividing the total oil modifying portion present (oil, or fatty acid plus necessary polyol to produce neutral oil) by the oil plus the polyol plus the aromatic dicarboxylic acid minus the water formed through esterification. Thus a five length oil-modified alkyd would correspond to a 33.8% oil modification; a 10 length to a 51.25% oil modification; a 6 length to 38.2% oil modification and a 9 length to about 50% oil modification. As there is no definite art recognized method of referring to oil length of oil-modified alkyd resins, both of the above terminologies may be used with equal accuracy.

This invention is further limited to the particular class of drying oil modifiers useful, and includes only the non-conjugated, non-bodied, unoxidized drying oil fatty acids including linseed oil, soya bean oil, safflower, sunflower, which oils exemplify non-conjugated drying oils of iodine value from 120 to 205. The term "non-conjugated drying oil" as used herein refers to refined but otherwise untreated by heating, bodying, oxidizing, etc., drying oils having isolate non-cumulative double bonds and an iodine value within the range noted.

Having set forth some of the limitation inherent in the particular field to which this invention relates, the particular field of usefulness and the nature of the invention follows in greater detail.

The particular field of usefulness of the present invention resides in the method of manufacture of clear, transparent film-forming non-conjugated oil-modified alkyd resinous polymers condensed during manufacture with monovinyl aromatic compounds wherein the oil length of the alkyd portion of the copolymer is from 5 to 10 or about 34% to about 52% oil, and preferably from 6 to 9 or about 38% to about 50% oil, the ratio of aromatic dibasic acid to monovinyl aromatic compound is correspondingly between 1:1 to 1:3.

In methods heretofore suggested, resinous products coming within the above-described field of usefulness were extremely difficult, if not impossible, to produce. This, for the reason that the reactants, when combined in the usual manner of alkyd formation followed by attempted copolymerization with aromatic vinyl compounds, reacted in such manner as to produce a non-homogeneous solvent-insoluble reaction product of such high acid value (e. g., above 50) and gelatinous character as to be useless in the coating art.

Alternatively to the procedure herein described, one might first copolymerize the non-conjugated oil or fatty acid component with an aromatic vinyl compound by the method of copending patent application of Arvin, U. S. Serial No. 112,649, filed August 26, 1949, now U. S. Patent 2,627,509 issued February 3, 1953, employing sulfur dioxide as catalysts for the reaction and thereafter form the oil-modified alkyd from the resultant copolymer. This latter method is inefficient both in time and thermally, for about 15 hours are required to copolymerize the non-conjugated drying oil with the monovinyl aromatic compound, and an additional 8 to 12 hours are required to form the modified alkyd from the first product. Moreover, resins made by adaptation of the methods of Arvin have been found to dry more slowly, to be of higher viscosity and of a more brittle nature than by the method here disclosed. The differences in character noted are believed to be proof of a fundamental difference in the physicochemical structure of the resins produced by the varying procedures and of the novelty of the present resins.

It is the general object of this invention to provide a process for the manufacture of a non-conjugated drying oil-monovinyl aromatic modified alkyd resin having a minimum oil length of 5 and a maximum oil length of 10, which comprises the steps of treating the total of the alcoholized non-conjugated drying oil component with the total polyhydric alcohol component, adding from not less than 33⅓ percent to not more than 66⅔ percent by weight of the total aromatic dicarboxylic acid component to the alcoholized oil or mixtures of mono-, di- and triglycerides thereof holding the reactants at esterifying temperatures normally employed in the formation of alkyds, e. g., from about 420 degrees to 460 degrees F., until the reaction mass shows practical neutrality as indicated by its acid value, reducing the reaction temperature to a range of from 325 degrees to 375 degrees F., and preferably between 340° and 360° F., adding to said reaction mass in increments from 100 percent to 300 percent by weight of the aromatic dicarboxylic acid component of an aromatic vinyl compound, said reaction mass containing dispersed therein about 2 percent by weight of the vinyl component of a peroxide polymerization catalyst, maintaining the temperature within the last stated temperature range for a time interval sufficient to tie in the added vinyl (about one hour, more or less) adding the remainder of the aromatic dicarboxylic acid component, and thereafter increasing the temperature to and holding it within said esterification temperature range until the acid value and the cure of the formed resin fall below a predetermined maximum value (e. g., less than 50) according to the requirements of the product.

It is a correlative object of this invention to produce a novel class of resinous products of the alkyd class whose component elements include an aromatic vinyl compound, a non-conjugated drying oil, a polyhydric alcohol and an aromatic dicarboxylic acid wherein the ratio of the aromatic dibasic acid to non-conjugated drying oil is from 7:5 to 7:10 and preferably from 11:10 to 7.8:10. The ratio of aromatic dicarboxylic acid to aromatic monovinyl compound is within a ratio of from 1:1 to 1:3, and the aromatic vinyl compound is from 50 percent to 200 percent by weight of said drying oil component, said resin characterized by improved flexibility, greater speed of drying and lower viscosity than resins of the same class heretofore produced by alternative techniques. Modified alkyd resins of the above class (e. g., above oil length of 10 or above about 52% oil modification) are not difficult to manufacture. Premature gelation before the acid value is decreased to the desired level occurs where the oil modification, as here, is of less quantity.

The term "aromatic dicarboxylic acid," as used herein, refers in particular, to phthalic anhydride, but also includes isophthalic acid, terephthalic acid, orthophthalic acid, and other aromatic dicarboxylic acids characterized by a plurality of aromatic nuclei, e. g., naphthalic anhydride, diphenic acid, etc.

By the generic term "aromatic vinyl compound" is meant to include compounds structurally similar to styrene, containing one or more aromatic nuclei and a single vinyl group as the sole center of reaction in the side chain thereof. The vinyl portion of the aromatic compound is preferably non-substituted, but small amounts of aromatic compound substituted in the vinyl group may be employed in conjunction with the non-substituted aromatic vinyls, e. g., α-methyl styrene. Compounds of greatest interest include those containing an aromatic nucleus and a single vinyl

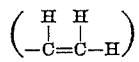

group. Those presently available commercially include styrene and vinyl toluene. Other aromatic vinyl compounds, now laboratory curiosities, e. g., vinyl naphthalene, etc., are also acceptable.

As is well known in the alkyd art, a wide variety of polyols are available for reaction with dibasic acids and drying oils to form oil-modified alkyds. Glycerine is here the preferred polyol, although it is obvious that both dihydric alcohols and alcohols having a functionality greater than 3 (e. g., more than 3 reactive hydroxyl groups) may be employed in whole or in part in the production of alkyd resins. It has been observed here that when the alkyd is short, e. g., about 5, alcohols of functionality greater than 3, e. g., pentaerythritol, tend to give high acid value products, or premature gelation due to excessive cross linking. Polyols of 2 to 4 reactive hydroxyl groups are, therefore, preferred, as experimentation is necessary to balance out polyols as to functionality, when the number of reactive groups is above 4. Such balancing is within the skill of experienced alkyd resin chemists, however. Reference to the alkyd art will serve to supply listings of polyols useful in alkyd formation.

As is well known in the alkyd art, the esterification or alkyd-forming reaction may be performed by a fusion process in the absence of solvents, or in the presence of organic solvents in a reflux type of apparatus. Both methods of conducting the resin-forming reaction are useful in the present process, and this application should not be so construed to limit the process to one method or the other, albeit the fusion method is preferred.

Alcoholysis of drying oils as an initial step in the formation of oil-modified alkyd resins is well known and has previously been described in the literature. Alcoholysis involves the heating of a drying oil together with a polyol in the presence of a catalyst, e. g., litharge, lime, etc., at temperatures from 250 degrees to about 475 degrees F. for sufficient time to form a mixture of mono-, di- and triglycerides in the case where glycerol is the added polyol, or a more complex mixture where the added polyol is dipentaerythritol, for example. Whether alcoholysis has reached the desired extent, can be determined by several different tests, e. g., solubility in methyl alcohol, etc.

While it is here preferred to employ an alcoholysis of the non-conjugated drying oil, it is equally well known to use non-conjugated drying oil fatty acids and polyol, and by esterification to arrive at the same practical product, e. g., a mixture of mono-, di-, tri-, etc., esters, depending upon the nature of the polyol selected. The term "alcoholysis" as used herein is intended to include broadly the treatment of a non-conjugated drying oil, or drying oil fatty acids with a polyol to form mixed esters of said fatty acids characterized by their solubility in methyl alcohol. Suitable end point can be determined in either case if the alcoholized product will withstand a dilution with 3 times its volume with methyl alcohol without turbidity. This test is quite standard and well known in the art.

The acid value or acid number as used herein is the number of milligrams of KOH required to neutralize one gram of substance.

The cure value, as used herein, is defined as the number of seconds required to cause a very thin film of resinous product to gel when continuously spread over a hot plate surface with a pencil-shaped metal instrument while the temperature of the surface of said plate is maintained at a constant temperature of 392 degrees F.

With the above background of introductory material in mind, the following examples are included to illustrate specifically the process of the invention. While representative species have been chosen, the invention is not to be construed as limited to the specific species chosen for illustrative purposes.

*Example 1*

767 parts of alkali refined soya bean oil and 296 parts of glycerine were heated together in a vessel equipped wiht agitator and reflux condenser. At 405 degrees F., one part of litharge was added, the temperature of the mass increased to 440 degrees F., and held for thirty minutes. At this point in the alcoholysis, one volume of the "split" oil could be reduced with methyl alcohol to the extent of 3 volumes without turbidity. One half of the total phthalic anhydride component or 312 parts, were added to the reaction mass and the temperature held at 440 degrees F. for an additional hour. The temperature was then allowed to fall off to 350 degrees F., and a blend of 842 parts of styrene and 25 parts of p-tertiary butyl peroxide added in increments over about a one hour period at 350 degrees F. The temperature was increased to 400 degrees F. and held for about 20 minutes. The remaining half of the total phthalic anhydride component, or 312 parts, were added to the reaction mass, the temperature increased to 440 degrees F. and held for approximately 6 hours, to produce a resin having an acid value of 15 and a cure of 11 seconds. The material had a mineral spirits tolerance of 300 percent, was clear, with a color of 6 (Gardner-Holdt). The oil length of the alkyd is 8.6 or about 50% oil and the ratio of dibasic acid ot styrene is about 1:1.35. Reduction of acid values and cure values of the resins to a value below 20 produces more desirable products for use in protective and decorative coatings, and it is preferred to so adjust ratios of ingredients and time of cook to accomplish this end.

*Example 2*

Made in the same manner as Example 1, with the exception that one third of the phthalic anhydride was added after alcoholysis of the soya bean oil. The rying rate of the resultant resin was appreciably slower than that of Example 1, and the time required to cook, after the last phthalic anhydride addition, was 24 hours, giving an acid value of 17 and a cure of 34 seconds.

*Example 3*

Made in the same manner as Example 1, with the exception that two thirds of the phthalic anhydride were added after alcoholysis of the soya bean oil. The drying rate of the resin was slower than Example 1, comparable to Example 2 and required after the last phthalic addition approximately 17 hours to cook to a cure of 12 seconds and an acid value of 13.

*Example 4*

Made in the same manner as Example 1, except 717 parts of soya bean oil, 276 parts glycerine and 584 parts phthalic anhydride were employed, initially adding one half the total of the phthalic anhydride component after alcoholysis of the oil.

The major change was in the increase of the amount of styrene employed from 842 parts to 1434 parts. This resin cooked to a cure of 11 seconds and an acid value of 16 in approximately the same time as in Example 1. The ratio of phthalic to styrene was about 1:2.5.

*Example 5*

This example is included to show that when the length of the resinous product is very short, here 5 or about 33% oil modification, that the amount of aromatic vinyl compound must be reduced in order to obtain a useful product. In this example the ratio of phthalic anhydride to styrene was about 1:1.35. At this oil length and ratio of acid to styrene, it becomes increasingly difficult to reduce the acid value to the desired level before the cure becomes so short in time as to cause premature gelation.

The procedure was the same as in Example 1, except 445 parts of soya bean oil, 296 parts glycerine, 1 part litharge, 625 parts phthalic anhydride total, 842 parts styrene and 25 parts ditertiary butyl peroxide were employed. Fifty-five minutes after the additoin of the last half of the phthalic anhydride, the reactants began to gel, and the cook was discontinued. Where the length is as low as 5, the ratio of dibasic acid to styrene should be about 1:1 at maximum styrene content (see Example 8).

*Example 6*

Procedure was the same as in Example 1, but the length of the alkyd was 5 or about 33% oil modification, as in Example 5. The principal change was the reduction of the phthalic anhydride to styrene ratio to 625:600 or approximately 1:1. The quantity of materials employed in this example were as follows: 445 parts soya bean oil, 296 parts glycerine, 1 part litharge, 625 parts phthalic anhydride, 600 parts styrene and 18 parts of organic peroxide catalyst. The time of cook, after the addition of the last half portion of phthalic anhydride, was slightly more than 3 hours and 15 minutes. The acid value and the cure value were less than 50 at the end of the cook. Acid values and cures above 50 produce resins of poor drying character, having excessive sensitivity to basic pigments.

*Example 7*

Same as Example 1, with the exception that linseed oil was substituted for soya bean oil. The acid value of the final resin was 18.7 and the cure 13 seconds. The product had a mineral spirits tolerance of 200 percent. The time of cook, after addition of the second half of phthalic anhydride was slightly in excess of 6 hours.

*Example 8*

The process was similar to that of Example 1, but 445 parts of safflower oil, 296 parts of glycerine, 1 part litharge, 625 parts phthalic anhydride, 696 parts styrene and 21 parts of benzoyl peroxide were employed in lieu of the proportions of Example 1. A carbon dioxide blanket was maintained over the batch during the cook. This alkyd was a 5 length and the ratio of phthalic anhydride to styrene was 626:696 or about 1:1.1. From the behavior of the batch during cooking, this is believed to be about the maximum of both phthalic anhydride and styrene which may be employed. The cure value decreases so rapidly that it is difficult to bring the acid value down to a sufficient figure to be practical in more acid sensitive formulations.

*Example 9*

Same method as Example 1, with the exception that pentaerythritol was substituted for glycerine as the polyol employed. The portions of reactants combined were as follows: 446 parts soya bean oil, 319 parts pentaerythritol, 1 part litharge, 625 parts phthalic anhydride, 723 parts styrene and 22 parts cumene hydroperoxide catalyst. In a repeat example, wherein the oil length was increased from 5, as here, to 5.5 lower acid value products were obtained. When the polyol has a functionality in excess of 3, it is recommended that the oil length be increased slightly above 5 where low acid values are desired.

*Example 10*

734 parts soya bean oil fatty acids and 330 parts of glycerine were heated together in an open kettle equipped with an agitator with agitation to a temperature of 420 degrees F. One part of litharge was pasted in a small quantity of fatty acid and added to the reactants. The temperature was held at 420 degrees, plus or minus 10 degrees, for one hour. At this point the mixed gylcerides formed were soluble to the extent of one volume of the glycerides in 3 volumes of methyl alcohol without turbidity.

From this point on, the process, ingredients, quantities, time and temperature were held as nearly exactly the same as laboratory conditions would permit as in Example 1. The resinous product formed was not found to be practically different from that of Example 1.

*Example 11*

Same procedure as Example 1, except vinyl toluene was substituted for styrene and linseed for soya oil. The proportions of ingredients were as follows: 767 parts alkali refined linseed oil, 296 parts glycerine, 1 part litharge, 956 parts vinyl toluene, 25 parts ditertiary butyl peroxide and 625 parts phthalic anhydride. The length of the above alkyd was 8.6 as about 50% oil modification and the ratio of phthalic anhydride to vinyl toluene 1:1.53. It will be observed that the longer the alkyd, the greater the amount of aromatic vinyl may be copolymerized with it during the alkyd formation. As a result of many experimental batches, it has been observed that when the length of the alkyd is a minimum of 5, the maximum ratio of phthalic anhydride to aromatic vinyl is about 1:1, whereas when the oil length is 10, the ratio of phthalic to vinyl is about 1:3. In other words, as the oil content is increased, the amount of phthalic anhydride decreased, greater amounts of aromatic vinyl component may be copolymerized therewith within the lengths from 5 to 10, of specific interest here.

While it is possible to add from one third to two thirds of the aromatic dibasic acid to the alcoholized oil as illustrated in the examples, optimum cooking times and optimum drying rates of the resultant aromatic vinyl-non-conjugated drying oil-modified alkyd are obtained by initially adding from 45 percent to 55 percent of the dibasic acid to the alcoholized oil in that step. It is with this critical step that the invention is most concerned, for before this step was found to be critical, alkyds modified as described, having an oil length from 5 to 10, or from about 33% to 52% oil modification, had not been produced having the requisite characteristics for use in coatings.

Having thus described and illustrated my invention, I claim:

1. A process for the manufacture of a clear homogeneous polymer comprising a non-conjugated non-bodied, unoxidized oil-aromatic vinyl modified alkyd wherein the oil has an iodine value of from about 120 to 205 and constitutes at least 33% to about 52% of the oil-modified alkyd resin therein consisting essentially of adding to the total quantity of alcoholized non-conjugated drying oil component from one third to two thirds of the total aromatic dicarboxylic acid employed, holding the alcoholized oil and the dicarboxylic acid at esterifying temperatures until the mass reaches an approximately neutral acid value, reducing the temperature to the range from 325 to 375 degrees F., adding to the hot mass in increments over a time interval from 100 percent to 300 percent by weight, based upon the dibasic acid component of an aromatic vinyl compound containing a single vinyl group as the sole center of reaction and in the presence of an organic peroxide polymerization catalyst, maintaining the temperature within the last stated range for approximately one hour after the addition of the last increment addition of said vinyl compound, adding the remainder of the aromatic dicarboxylic acid component, and again increasing the temperature of the resin-forming reactants to said esterification range and holding the temperature within said range until the acid value is reduced to a value at least below 50 but arresting the reaction before gelation.

2. A process for the manufacture of a clear homogeneous polymer comprising a non-conjugated, non-bodied, unoxidized oil-aromatic vinyl modified alkyd wherein the oil has an iodine value of from about 120 to 205 and constitutes from about 38% to about 50% of the oil-modified alkyd resin therein consisting essentially of alcoholizing the non-conjugated drying oil component with the total polyol component, adding to the alcoholized drying oil from one third to two thirds of the total aromatic dicarboxylic acid component, heating the said reactants to an esterifying temperature within the range of from 420 to 480 degrees F. and holding the reactants within said temperature range until the mass reaches an approximately neutral acid value, reducing the temperature to within the range of from 325 to 375 degrees F., adding to the hot mass in increments over a time interval from 100 percent to 300 percent by weight based upon the dicarboxylic acid component of an aromatic vinyl compound containing a single vinyl group as the sole center of reaction and in the presence of an organic peroxide polymerization catalyst maintaining the temperature within the last stated range for approximately one hour after the addition of the last increment of said vinyl compound, adding the remainder of the aromatic dicarboxylic acid component, and again increasing the temperature of the resin-forming reactants to said esterification range and holding the temperature within said range until the acid number is reduced to a value at least below 50 but arresting the reaction before gelation.

3. A process for the manufacture of a clear homogeneous polymer comprising a non-conjugated, non-bodied, unoxidized oil-aromatic vinyl modified alkyd wherein the oil has an iodine value of from about 120 to 205 and constitutes from about 38% to about 50% of the oil-modified alkd resin therein consisting essentially of alcoholizing the non-conjugated drying oil component with the total polyol component, adding to the alcoholized drying oil from 45 percent to 55 percent of the total aromatic dicarboxylic acid component, heating the said reactants to an esterifying temperature within the range of from 420 to 480 degrees F. and holding the reactants within said temperature range until the mass reaches approximately neutral acid value, reducing the temperature to within the range of from 340 to 360 degrees F., adding to the hot mass in increments over a time interval from 100 percent to 300 percent by weight based upon the dicarboxylic acid component of an aromatic vinyl compound containing a single vinyl group as the sole center of reaction and in the presence of an organic peroxide polymerization catalyst maintaining the temperature within the last stated range for approximately one hour after the addition of the last increment of said vinyl compound, adding the remainder of the dicarboxylic acid component and again increasing the temperature of the resin-forming reactants to said esterification range and holding the temperature within said range until the acid number is reduced to a value at least below 50 but arresting the reaction before gelation.

4. A process for the manufacture of a clear homogeneous polymer comprising a non-conjugated, non-bodied, unoxidized oil-aromatic vinyl modified phthalic anhydride alkyd wherein the oil has an iodine value of from about 120 to 205 and constitutes from about 38% to about 50% of the oil-modified alkyd resin therein consisting essentially of alcoholizing the non-conjugated drying oil component with the total polyol component, adding to the alcoholized drying oil from 45 percent to 55 percent of the total phthalic anhydride component, heating the said reactants within the range of from 420 to 480 degrees F. and holding the reactants within said temperature range until the mass reaches an approximately neutral acid value, reducing the temperature to within the range of from 340 to 360 degrees F., adding to the hot mass in increments over a time intreval from 100 percent to 300 percent by weight based upon the total phthalic anhydride component of an aromatic vinyl compound containing a single vinyl group as the sole center of reaction and in the presence of an organic peroxide polymerization catalyst maintaining the temperature within the last stated range from approximately one hour after the addition of the last increment of said vinyl compound, adding the remainder of the phthalic anhydride component, and again increasing the temperature of the resin-forming reactants to said esterification range and holding the temperature within said range until the acid number is reduced to a value at least below 50 but arresting the reaction before gelation.

5. A process for the manufacture of a clear homogeneous polymer comprising a non-conjugated, non-bodied, unoxidized oil-aromatic vinyl modified phthalic anhydride alkyd wherein the oil has an iodine value of from about 120 to 205 and constitutes from about 38% to about 50% of the oil-modified alkyd resin therein consisting essentially of alcoholizing the non-conjugated drying oil component with the total polyol component, adding to the alcoholized drying oil from 45 percent to 55 percent of the total phthalic anhydride component, heating the said reactants to an esterifying temperature within the range of from 420 to 480 degrees F. and holding the reactants within said temperature range until the mass reaches approximately neutral acid value, reducing the temperature to within the range of from 340 to 360 degrees F., adding to the hot mass in increments over a time interval from 100 percent to 300 percent by weight based upon the phthalic anhydride component of styrene and in the presence of an organic peroxide polymerization catalyst maintaining the temperature within the last stated range for approximately one hour after the addition of the last increment of sytrene, adding the remainder of the phthalic anhydride component, and again increasing the temperature of the resin-forming reactants to said esterification temperature range and holding the temperature within said range until the acid number is reduced to a value at least below 50 but arresting the reaction before gelation.

6. A process for the manufacture of a clear homogeneous polymer comprising a non-conjugated, non-bodied, unoxidized oil-aromatic vinyl modified phthalic anhydride alkyd wherein the oil has an iodine value of from about 120 to 205 and constitutes from about 38% to about 50% of the oil-modified alkd resin therein consisting essentially of alcoholizing the non-conjugated drying oil component with the total polyol component, adding to the alcoholized drying oil from 45 percent to 55 percent of the total phthalic anhydride component, heating the said reactants to an esterifying temperature within the range of from 420 to 480 degrees F. and holding the reactants within said temperature range until the mass reaches approximately neutral acid value, reducing the temperature to within the range of from 340 to 360 degrees F., adding to the hot mass in increments over a time interval from 100 percent to 300 percent by weight based upon the total phthalic anhydride component of vinyl toluene and in the presence of an organic peroxide polymerization catalyst maintaining the temperature within the last stated range for approximately one hour after the addition of the last increment of said vinyl compound, adding the remainder of the phthalic anhydride component, and again increasing the temperature of the resin-forming reactants to said esterification range and holding the temperature within said range until the acid number is reduced to a value at least below 50 but arresting the reaction before gelation.

7. A process for the manufacture of a clear homogeneous polymer comprising a non-conjugated, non-bodied, unoxidized oil-aromatic vinyl modified alkyd wherein the oil has an iodine value of from about 120 to 205 and constitutes from about 38% to about 50% of the oil-modified alkyd resin therein consisting essentially of alcoholizing the non-conjugated drying oil component with the total polyol component, adding to the alcoholized drying oil from 45 percent to 55 percent of the total aromatic dicaroxylic acid component, heating the said reactants to an esterifying temperature within the range of from 420 to 480 degrees F. and holding the reactants within said temperature range until the mass reaches approximately neutral acid value, reducing the temperature to within the range of from 340 to 360 degrees F., adding to the hot mass in increments over a time interval from 100 percent to 300 percent by weight based upon the dicarboxylic acid component of an aromatic vinyl compound containing a single vinyl group as the sole center of reaction and in the presence of an organic peroxide polymerization catalyst maintaining the temperature within the last stated range for approximately one hour after the addition of the last increment of said vinyl compound, adding the remainder of the aromatic dicarboxylic acid component, and again increasing the temperature of the resin-forming reactants to said esterification range and holding the temperature within said range until the acid number is reduced to values of not greater than about 20 but arresting the reaction before gelation.

8. A process for the manufacture of a clear homogeneous polymer comprising a non-conjugated, non-bodied, unoxidized oil-aromatic vinyl modified phthalic anhydride-glycerine alkyd wherein the oil has an iodine value of from about 120 to 205 and constitutes from about 38% to about 50% of the oil-modified alkyd resin therein consisting essentially of alcoholizing the total non-conjugated drying oil component with the total glycerine component, adding to the alcoholized drying oil from 45 percent to 55 percent of the total phthalic anhydride component, heating the said reactants within the range of from 420 to 480 degrees F. and holding the reactants within said temperature range until the mass reaches an approximately neutral acid value, reducing the temperature to within the range of from 340 to 360 degrees F., adding to the hot mass in increments over a time interval from 100 percent to 300 percent by weight based upon the total phthalic anhydride component of an aromatic vinyl compound containing a single vinyl group as the sole center of reaction and in the presence of an organic peroxide polymerization catalyst maintaining the temperature within the last stated range from approximately one hour after the addition of the last increment of said vinyl compound, adding the remainder of the phthalic anhydride component, and again increasing the temperature of the resin-forming reactants to said esterification temperature range and holding the temperature within said range until the acid number is reduced to a value at least below 50 but arresting the reaction before gelation.

9. A process for the manufacture of a clear homogeneous polymer comprising a non-conjugated, non-bodied, unoxidized oil-aromatic vinyl modified phthalic anhydried-glycerine alkyd wherein the oil has an iodine value of from about 120 to 205 and constitutes from about 38% to about 50% of the oil-modified alkyd resin therein consisting essentially of alcoholizing the total non-conjugated drying oil component with the total glycerine component, adding to the alcoholized drying oil from 45 percent to 55 percent of the total phthalic anhydride component, heating the said reactants to a temperature within the range of from 420 to 480 degrees F., and holding the reactants within said temperature range until the mass reaches approximately neutral acid value, reducing the temperature to within the range of from 340 to 360 degrees F., adding to the hot mass in increments over a time interval from 100 percent to 300 percent by weight based upon the total phthalic anhydride component of styrene, and in the presence of an organic peroxide polymerization catalyst maintaining the temperature of the reactants within the last stated range for approximately one hour after the addition of the last increment of styrene, adding the remainder of the phthalic anhydride component and again increasing the temperature of the resin-forming reactants to said esterification temperature range and holding the temperature within said range until the acid number is reduced to values of not greater than about 20 but arresting the reaction before gelation.

10. A process for the manufacture of a clear homogeneous polymer comprising a non-conjugated, non-bodied, unoxidized oil-aromatic vinyl modified phthalic anhydride-glycerine alkyd wherein the oil has an iodine value of from about 120 to 205 and constitutes from about 38% to about 50% of the oil-modified alkyd resin therein consisting essentially of alcoholizing the total non-conjugated drying oil component with the total glycerine component, adding to the alcoholized drying oil from 45 percent to 55 percent of the total phthalic anhydride component, heating the said reactants to a temperature within the range of from 420 to 480 degrees F., and holding the reactants within said temperature range until the mass reaches an approximately neutral acid value, reducing the temperature to within the range of from 340 to 360 degrees F., adding to the hot mass in increments over a time interval from 100 percent to 300 percent by weight based upon the total phthalic anhydride component of vinyl toluene and in the presence of an organic peroxide polymerization catalyst maintaining the temperature within the last stated range for approximately one hour after the addition of the last increment of vinyl toluene, adding the remainder of the phthalic anhydride component and again increasing the temperature of the resin-forming reactants to said esterification range and holding the temperature within said range until the acid number is reduced to values of not greater than about 20 but arresting the reaction before gelation.

11. The product of the process of claim 1.

References Cited in the file of this patent

UNITED STATES PATENTS

| | | |
|---|---|---|
| 2,392,710 | Wakeford et al. | Jan. 8, 1946 |
| 2,627,509 | Arvin | Feb. 3, 1953 |

OTHER REFERENCES

Wakeman, R. L.: Chemistry of Commercial Plastics, 1947, page 246.